United States Patent
Pestoni et al.

(10) Patent No.: US 9,124,422 B2
(45) Date of Patent: Sep. 1, 2015

(54) SYSTEM AND METHOD FOR DIGITAL RIGHTS MANAGEMENT WITH SECURE APPLICATION-CONTENT BINDING

(75) Inventors: Florian Pestoni, Mountain View, CA (US); Sunil C. Agrawal, Milpitas, CA (US); Pritham Shetty, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1083 days.

(21) Appl. No.: 12/475,325

(22) Filed: May 29, 2009

(65) Prior Publication Data
US 2013/0124862 A1     May 16, 2013

(51) Int. Cl.
*H04L 9/32*     (2006.01)
*H04L 9/08*     (2006.01)
*G06F 21/12*     (2013.01)
*G06F 21/10*     (2013.01)
*G06F 9/455*     (2006.01)

(52) U.S. Cl.
CPC .............. *H04L 9/0825* (2013.01); *G06F 21/10* (2013.01); *G06F 21/121* (2013.01); *G06F 9/455* (2013.01); *H04L 2209/603* (2013.01)

(58) Field of Classification Search
CPC .......... G06F 21/554; G06F 2221/2101; G06F 21/121; G06F 21/10; G06F 9/455; H04L 63/1466; H04L 63/1408; H04L 63/1425; H04L 63/1441; H04L 63/1416; H04L 9/0825; H04L 2209/603
USPC ......... 713/168; 726/26, 28, 29; 380/277, 285; 718/1
See application file for complete search history.

(56) References Cited

U.S. PATENT DOCUMENTS

| | | | |
|---|---|---|---|
| 5,592,552 A | 1/1997 | Fiat | |
| 5,910,987 A | 6/1999 | Ginter et al. | |
| 6,226,618 B1* | 5/2001 | Downs et al. | 705/51 |
| 6,856,976 B2 | 2/2005 | Bible, Jr. et al. | |
| 6,873,976 B2 | 3/2005 | Bible, Jr. et al. | |
| 7,103,574 B1* | 9/2006 | Peinado et al. | 705/51 |
| 7,184,091 B2* | 2/2007 | Matsuda et al. | 348/369 |
| 7,356,143 B2* | 4/2008 | Morten | 380/201 |
| 7,434,048 B1 | 10/2008 | Shapiro et al. | |
| 7,484,090 B2* | 1/2009 | Ohmori et al. | 713/158 |
| 7,536,355 B2* | 5/2009 | Barr et al. | 705/57 |

(Continued)

OTHER PUBLICATIONS

"Flash DRM Software Released, Complete Code Protection for Adobe Flash SWF Files," Press Release, May 15, 2009, found at http://www.theopenpress.com/index.php?a=press&id=50173.

(Continued)

*Primary Examiner* — Mohammad A Siddiqi
(74) *Attorney, Agent, or Firm* — Wolfe-SBMC

(57) ABSTRACT

Various embodiments of a system and method for digital rights management with secure application-content binding are described. Various embodiments may include a system configured to decrypt an encrypted application key with a private key. The system may also be configured to decrypt an encrypted application including a binding key with the decrypted application key. The system may also be configured to decrypt an encrypted content key with the binding key from the decrypted application. The system may be further configured to decrypt encrypted content with the decrypted content key. In various embodiments, the system may also be configured to consume the decrypted content with the decrypted application.

22 Claims, 6 Drawing Sheets

(56) References Cited

U.S. PATENT DOCUMENTS

| | | | |
|---|---|---|---|
| 7,826,620 B2 * | 11/2010 | Ueda et al. | 380/281 |
| 7,870,198 B2 * | 1/2011 | Graham et al. | 709/206 |
| 2004/0162782 A1 | 8/2004 | Bible, Jr. et al. | |
| 2005/0097061 A1 | 5/2005 | Shapiro et al. | |
| 2005/0135626 A1 * | 6/2005 | Ball et al. | 380/277 |
| 2007/0294178 A1 * | 12/2007 | Pinder et al. | 705/57 |
| 2008/0244751 A1 * | 10/2008 | Peinado | 726/26 |

OTHER PUBLICATIONS

U.S. Appl. No. 12/027,981.
U.S. Appl. No. 11/000,637.

* cited by examiner

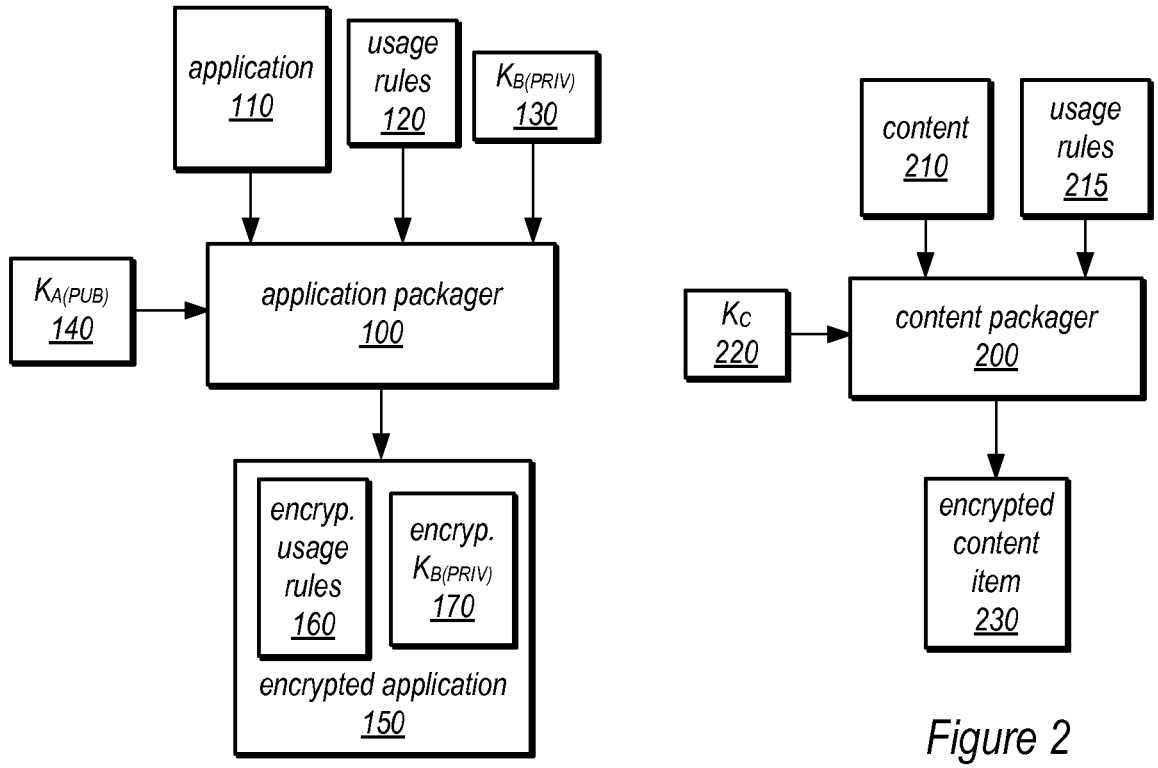
Figure 1
Figure 2
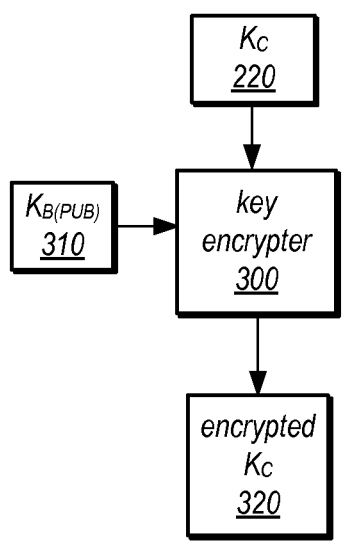
Figure 3
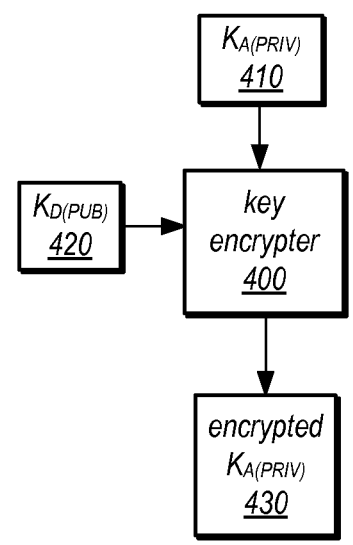
Figure 4

SYSTEM AND METHOD FOR DIGITAL RIGHTS MANAGEMENT WITH SECURE APPLICATION-CONTENT BINDING

BACKGROUND

1. Field of the Invention

The present invention is directed to computer systems. More particularly, it is directed to digital rights management within a computing environment.

2. Description of the Related Art

In prior years it would not be uncommon for an individual to obtain content (e.g., literary works, periodicals, music, and movies) from a retail location in the form of a physical medium. For example, an individual might travel to a local bookstore and purchase written works in the form of a book, newspaper, or magazine. In another example, an individual might purchase music stored on a Compact Disc (CD) or a motion picture stored on a Digital Video Disc (DVD). In recent years the ubiquity of the Internet and the World Wide Web has paved the way for alternative methods of obtaining content. For example, a user might log on to a music retailer's website and download a digital version of a music album. In other example, a user might log on to a movie subscription provider's website to download or stream a motion picture to view on a personal computer. In the case of books, a user might log on to a bookseller's website and download an electronic book ("e-book") for view on a computer system, such as a desktop computer or a handheld e-book reader.

The Internet and World Wide Web serve as a backbone for numerous file sharing mechanisms. Examples of such mechanisms include electronic mail ("email") and more advanced file distribution software, such as peer-to-peer ("P2P") file sharing applications. In many cases, such file sharing mechanisms are often utilized to distribute electronic content to individuals that are not authorized to access such content. Such distribution is likely due in part to the relative ease and anonymity of sharing files through such mechanisms. To combat unauthorized consumption of content, some content owners have adopted an approach to protecting their content known as digital rights management ("DRM"), which may include various techniques for limiting access of electronic content to authorized entities.

SUMMARY

Various embodiments of a system and method for digital rights management with secure application-content binding are described. In various embodiments, application for consuming content (e.g., playing content, displaying content, etc.) may be provided to a client system in encrypted form. Such an encrypted application may be encrypted with a particular private key (e.g., a device-specific key specific to the client system or an authorized device key, as described in more detail herein). Various embodiments may include a system (e.g., a client system) configured to decrypt an encrypted application key with a private key, and decrypt an encrypted application including a binding key with the decrypted application key. For instance, a client system might obtain an encrypted application and corresponding encrypted application key from a merchant system of a merchant that sells or rents electronic content. In various embodiments, the binding key within the application may bind the application to one or more particular content items. For instance, the system may also be configured to decrypt an encrypted content key with the binding key from the decrypted application, and decrypt encrypted content with the decrypted content key. In various embodiments, the system may also be configured to consume (e.g., play, display, or otherwise consume) the decrypted content (e.g., audio, video, multimedia, etc.) with the decrypted application.

BRIEF DESCRIPTION OF THE DRAWINGS

FIG. 1 illustrates a block diagram of an application packager, according to various embodiments.

FIG. 2 illustrates a block diagram of a content packager, according to various embodiments.

FIG. 3 illustrates a block diagram of logic for encrypting content keys, according to various embodiments.

FIG. 4 illustrates a block diagram of logic for encrypting application keys, according to various embodiments.

Figure 5:
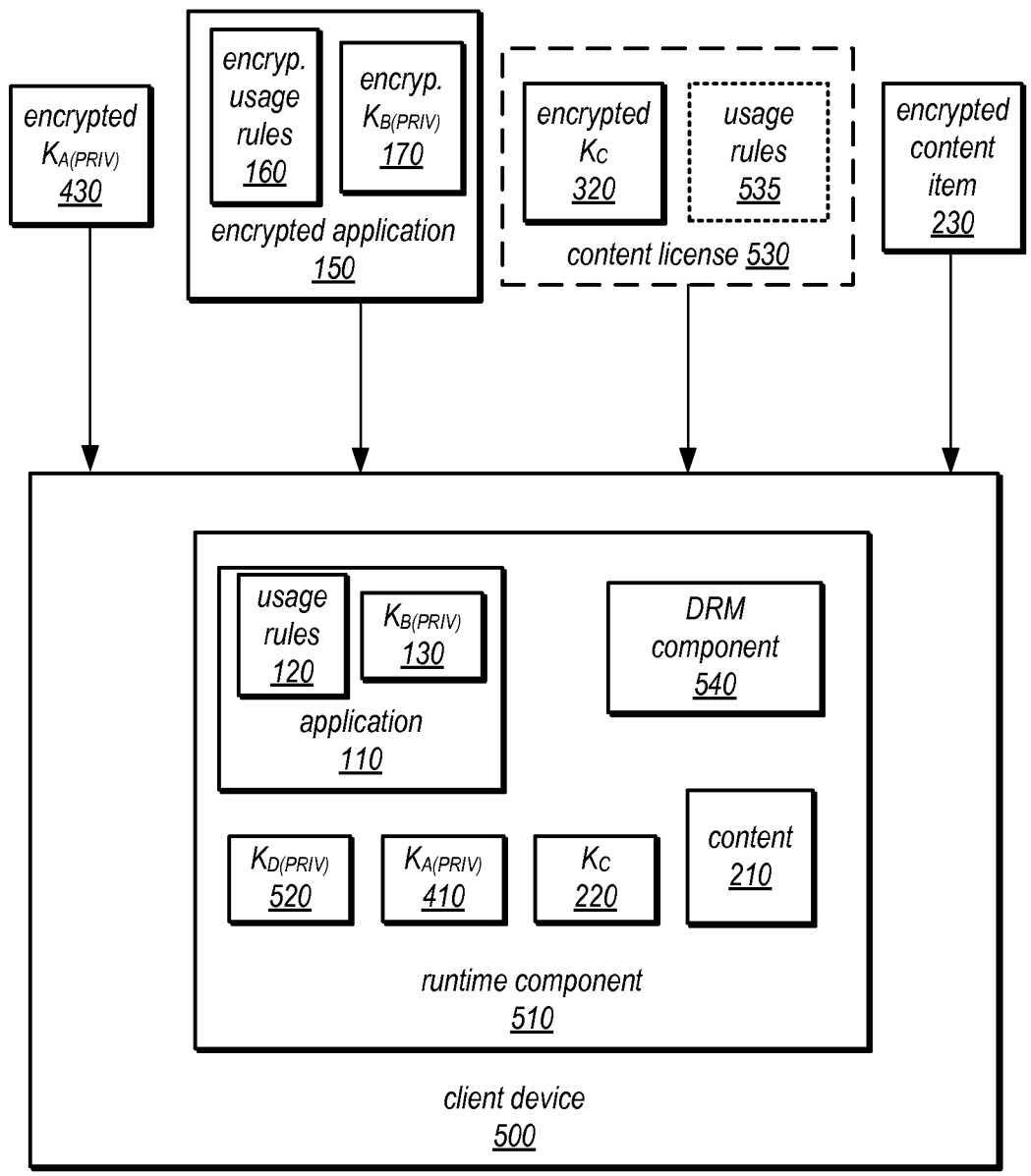
FIG. 5 illustrates a block diagram of a client device configured to implement various aspects of the system and method for digital rights management with secure application-content binding, according to various embodiments.

While the system and method for digital rights management with secure application-content binding is described herein by way of example for several embodiments and illustrative drawings, those skilled in the art will recognize that the system and method for digital rights management with secure application-content binding is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for digital rights management with secure application-content binding as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. In various portions of the description presented herein, the terms "validate", "verify", "validation", "verification", "validating", and "verifying" may be used interchangeably.

DETAILED DESCRIPTION OF EMBODIMENTS

Various embodiments of a system and method for digital rights management with secure application-content binding are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Note that the description presented herein may include one or more references to a one-way function or a cryptographic hash function, either of which may be referred to herein as simply a hash function. In various embodiments, the hash functions described herein may be any of various hash functions including, but not limited to, the Secure Hash Algorithm (SHA) (e.g., SHA-1, SHA-0, SHA-224, SHA-256, SHA-384, SHA-512, and other SHA variations), the RACE Integrity Primitives Evaluation Message Digest (RIPEMD) (e.g., RIPEMD-128, RIPMED-160, RIPEMD-256, RIPEMD-320, and other RIPEMD variations), the Message Digest algorithm (MD) (e.g., MD-3, MD-4, MD-5, and other MD variations), the Tiger and Tiger2 hash functions (e.g., Tiger-128, Tiger-160, Tiger-192, Tiger2-128, Tiger2-160, Tiger2-192, and other Tiger variations), the Very Efficient Substitution Transposition (VEST) (e.g., VEST-4, VEST-8, VEST-16, VEST-32, and other VEST variations), the WHIRLPOOL hash function, some other hash function whether presently known or developed in the future, and/or some combination or variation of any of the aforesaid hash functions.

Various embodiments include various encryption and/or decryption keys, any of which may be generated via a key derivation function (KDF). Key derivation functions may include one or more iterations or instances of hash functions and/or other cryptographic operations in order to generate an encryption or decryption key. Examples of key derivation function may include but are not limited to any key derivation functions specified by Public Key Cryptography Standards (PKCS) (e.g., PKCS-5) or Adobe® Password Security. In various embodiments, KDFs may be utilized by any of the various components described herein to generate encryption keys for symmetric encryption.

Various portions of this detailed description may refer to "client(s)" and "server(s)" or similar terminology. For instance, various embodiments may include (among other elements) a client system or client device (or simply a "client") and/or an authorized device group management server. It should be understood that the terms "client" and "server" do not impose any limitation on the operation, configuration, or implementation of such elements. It should be understood that these terms are used only as convenient nomenclature. Indeed, various embodiments are in no way limited by the principles of a conventional client-server architecture. For instance, any of the "clients" or "servers" described herein may be configured to communicate according to a variety of communication protocols or system architectures, such as a peer-to-peer (P2P) architecture or some other architecture, whether such architecture is presently known or developed in the future.

In various instances, this detailed description may refer to content (which may also be referred to as "content item(s)," "content data," "content information" or simply "data" or "information"). In general, content may include any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to Adobe® Flash® Video (.FLV) format or some other video file format whether such format is presently known or developed in the future.

In various embodiments, content may include electronic representations of music, spoken words, or other audio, which may include but is not limited to data files adhering to the MPEG-1 Audio Layer 3 (.MP3) format, Adobe® Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, Adobe® Photoshop® (.PSD) format or some other format for electronically storing text, graphics and/or other information whether such format is presently known or developed in the future. In some embodiments, content may include any combination of the above-described examples.

In various instances, this detailed disclosure may refer to consuming content or to the consumption of content, which may also be referred to as "accessing" content, "viewing" content, "listening" to content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Figure 9:
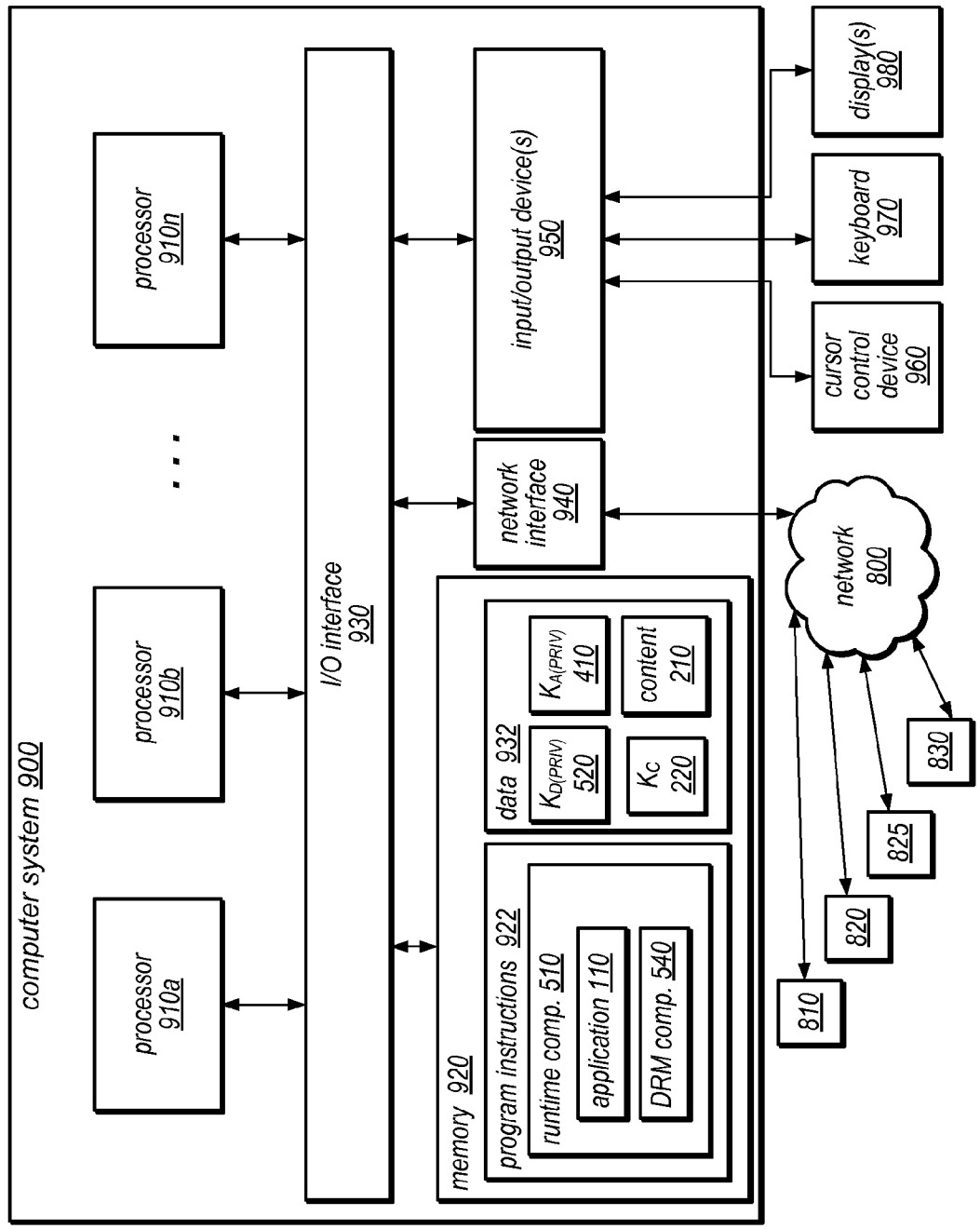
FIG. 9 illustrates an example computer system suitable for implementing various components of the system and method for digital rights management with secure application-content binding, according to various embodiments.

In various instances, this detailed description may refer to a devices configured to perform content consumption. In various embodiments, such a device may include but is not limited to a computing system (e.g., a desktop or laptop computer), a digital audio or multimedia player (e.g., an MP3 player), a personal digital assistant (PDA), a mobile phone, a smartphone, an e-book reader, a digital photo frame, or any other device or system configured to access, view, read, write, and/or manipulate any of the content data described herein. Any of such devices may be implemented via a computer system similar to that described with respect to FIG. 9.

Note that in various instances the description presented herein may refer to a given entity performing some action. It should be understood that this language may in some cases mean that a system (e.g., a computer system) owned and/or controlled by the given entity is actually performing the action.

Note that in various instances the description presented herein may refer to a public key being associated with a private key or a public key corresponding to private key. It should be understood that such statements may mean that such a public key forms a public key-private key pair with such a private key. Additionally, in some cases, a public key-private key pair may be referred to as simply a "key pair." Note that in various embodiments, public key-private key pairs may be generated via one or more iterations of hash functions and/or one or more iterations of key generation functions.

Introduction

Various embodiments may include techniques for securely binding content to a secured application; such a binding may in various embodiments ensure that protected content cannot be consumed on a device that is not equipped with an application approved for consuming such content. For example, instead of allowing content to be consumed by any application (e.g., unauthorized applications), content may in various embodiments be bound to an application configured with a specific set of DRM functionalities and/or content usage rules. In contrast to conventional systems that express content usage rules within content licenses, various embodiments may enable usage rules to be expressed as part of a secured application (e.g., usage rules stored as part of the data that represents the application). Due to the nature of DRM components that enforce usage rules of content licenses, such usage rules may in some cases be restricted to a small, somewhat inflexible set of rules. One example of a usage rule of a content license might include an expiration date of rented content. At the time of content consumption, the DRM component of a client device may be configured to enforce adherence to such an expiration date (e.g., before such date, content may be consumed; after such date, content cannot be consumed).

By enabling usage rules to be expressed as part of an application (in addition to or as a substitute to usage rules of a content license) in various embodiments, such usage rules may be generated via any programming language utilized to generate the application. In this way, the breadth and flexibility of the programming language may be utilized to generate usage rules outside of the scope of the usage rules supported by a DRM component. Usage rules expressed as part of the application (e.g., usage rules stored within the data that represents the application) may be referred to herein as "application-specified usage rules." In general, application-specified usage rules may include any rule that can be expressed by the programming language utilized to generate the application. By way of example, whereas a DRM component might support a usage rule (e.g., a usage rule from a content license) that specifies an expiration date for content, application-specified usage rules may specify that content is permitted to be consumed on odd days only or on the second Tuesday of every month, for example. By leveraging the breadth and flexibility of the programming language utilized to generate the application, application-specified usage rules may in various embodiments be more sophisticated than those supported by DRM components.

In various embodiments, to protect the integrity of an application as well as application-specified usage rules within that application, the application may be distributed in an encrypted form (including encrypted application-specified usage rules) as described in more detail below. In various embodiments, if a client system has obtained the appropriate encryption keys, the client system that receives the encrypted application may be configured to decrypt the application. To execute the application (e.g., for consuming content), the client system may utilize a secure load process to protect the application data from security attacks (e.g., an memory inspection attack). As described in more detail herein, a binding key within the application data may correspond to a binding key that protects certain content data. As described in more detail herein, these corresponding binding keys may ensure that certain content (e.g., content protected by a binding key) cannot be consumed on client systems that are not equipped with an appropriate application (e.g., an application that includes a corresponding binding key).

Application Packaging

FIG. 1 illustrates application packager 100 configured to package an application 110. In various embodiments, application packager 100 may be operated or controlled by a content owner or content distributor. For instance, a content distributor might distribute content via an e-commerce portal (e.g., a remote network-based portal, such as a website, configured to offer electronic content as the basis for commerce). In one example, a content distributor might package an application that is developed in-house for the purpose of consuming content distributed by the content distributor. For instance, a website that sells or rents video content may desire to have that content consumed on an application developed by the website owner (e.g., to more tightly control the manner in which the content is consumed). Examples of the application 110 to be packaged include audio or video players configured to consume audio or video content. In one example, application 110 may be a video application configured to consume content of the Adobe® Flash® Video (.FLV) format.

Application packager 100 may be configured to embed usage rules 120 into application 110 (e.g., into the data representing application 110) if such usage rules are not already embedded within application 110. Usage rules 120 may be application specified usage rules as described above. For example, application-specified usage rules 120 may include any rule that can be expressed by the programming language utilized to generate the application 110. As an alternative to application packager 100 embedding usage rules into application 110, usage rules 110 may be embedded within application 110 by some other element (e.g., via a software development tool) before or during packaging.

Application packager 100 may also be configured to embed private binding key $K_{B(PRIV)}$ 130 within application 110 (e.g., within the data representing application 110). $K_{B(PRIV)}$ 130 may be referred to herein as a binding key because its inclusion within the application may bind certain content to the application (described in more detail below with respect to FIG. 4). The binding of an application to content (or vice versa) may in various embodiments mean that such content cannot be consumed in the absence of such application (e.g., on a client device). For instance, an attacker may not be able to consume such content by utilizing a rogue application that does not adhere to DRM principles.

Application packager 100 may encrypt application 110, including usage rules 120 and $K_{B(PRIV)}$ 130, with a public application key $K_{A(PUB)}$ 140 to generate encrypted application 150, which may include encrypted usage rules 160 and an encrypted private binding key $K_{B(PRIV)}$ 170. Note that encrypted usage rules 160 and encrypted private binding key $K_{B(PRIV)}$ 170 are illustrated as encrypted versions of usage rules 120 and private binding key $K_{B(PRIV)}$ 130, respectively. The encryption of application 110 may protect the application itself as well as the binding of content to the application. For instance, the encryption of application 110 may protect any content within application 110. For example, application 110 might be a video player that includes a user interface with a graphical theme that includes images or other content subject to one or more property rights. Such images (or other content) may be protected by the encryption process performed by application packager 100 because in various embodiments a private key that corresponds to the public key $K_{A(PUB)}$ 140 may be required to decrypt the application. As described in more detail below, the distribution of such a private key may be protected by one or more authentication process (e.g., access to such private key may require certain credentials and/or inclusion within an authorized device group).

As described above, the encryption of application 110 may also protect the binding of content to the application, which may in various embodiments mean that such content cannot be consumed on a computer system that does not include application 110. For example, in various embodiments, the binding key embedded within application 110 (i.e., $K_{B(PRIV)}$ 130) may also protect the content that is bound to the application. For instance, as described in more detail below with respect to FIG. 4, the public binding key corresponding to $K_{B(PRIV)}$ 130 may encrypt a content key for decrypting content bound to the application. In various embodiments, the encrypted content key cannot be decrypted without the private binding key $K_{B(PRIV)}$ 130, which may in various embodiments only be obtained by a client system by decrypting encrypted application 150 to determine application 110 (which includes $K_{B(PRIV)}$ 130). By virtue of this property, various embodiments may require a client system to have possession of application 110 in order to access content bound to that application.

Content Packaging

FIG. 2 illustrates one example of a content packager 200 configured to package content 210. Content 210 may represent any of the content described above (e.g., videos, music, etc.). In many cases, content 210 may be stored in "clear" form, such as in an unencrypted state. Content 210 may be provided to content packager 200 by various entities. For instance, a content owner may provide content 210 to an entity controlling content packager 200, such as an entity that provides packaging and encoding services for digital content. While not illustrated, content packager 200 may also be configured to receive (or generate) usage rules, which may include one or more restrictions on the use, access, or consumption of the content including but not limited to restricting the access of content to a particular time period (e.g., a rental time period or some other time period), restricting the actions (e.g., view, copy, save, distribute, etc.) that can be performed with respect to the protected content, and/or some other restriction on the content (e.g., a restriction might ensure content be viewed with embedded advertising content). Note that various systems (e.g., a merchant system) might modify the usage rules at a later point in time (e.g., at transaction time). For instance, if a merchant sells a movie rental, the merchant may modify usage rules to specify an expiration date of the rental.

Content packager 200 may generate encrypted content item 230 and usage rules 215. The generation of encrypted content item 230 may in various embodiments include encrypting content 210. For instance, the content may be encrypted with a content encryption key $K_C$ 220 via a symmetric encryption process. (Note that in some embodiments an asymmetric encryption process may be utilized to encrypt content 210.) In various embodiments, content packager 200 may embed usage rules 215 within content 210 prior to encrypting content 210. In some cases, to generate encrypted content item 230, content packager 200 may be configured to encode content 210 according to various codecs (e.g., video compression codecs, an example of which includes video codecs utilized to generate Adobe® Flash® Video files).

Note that in some embodiments the inclusion of usage rules 215 within encrypted content item 230 may be optional. For instance, such usage rules may instead be included within a content license or some other data structure. In some cases, some usage rules may be included within encrypted content item 230 at packaging time and other usage rules may be included within a corresponding content license. In any case, the usage rules within encrypted application 150 (e.g., encrypted usage rules 160) may be different than the usage rules 215 and/or usage rules included within a content license for content 210.

Binding Content to a Secured Application Via Encryption

FIG. 3 illustrates a key encrypter 300 configured to bind content 210 to secure application 110 by encrypting content key 220 (e.g., the content key for decrypting encrypted content item 230) to generate encrypted content key $K_C$ 320. For example, key encrypter 300 may encrypt $K_C$ 220 with a public binding key $K_{B(PUB)}$ 310 that corresponds to the private binding key $K_{B(PRIV)}$ 130 included within encrypted application 150 (in encrypted form as encrypted private binding key 170). In this way, only a client system that has successfully decrypted encrypted application 150 may have access to the binding key for decrypting encrypted content key $K_C$ 320, according to various embodiments. In this way, various embodiments may ensure that encrypted content item 230 may only be decrypted and consumed on a system that includes a decrypted version of encrypted application 150. In various embodiments, key encrypter 300 may encrypt a content key at packaging time. In some embodiments, key encrypter 300 may be a component of content packager 200 described above.

Protecting Application Keys

In various embodiments, encryption keys of various embodiments may be encrypted with other encryption keys as part of implementing encryption schemes for binding content to a secure application. For instance, FIG. 4 illustrates a key encrypter 400 configured to encrypt a private application key $K_{A(PRIV)}$ 410 with a public device key $K_{D(PUB)}$ 420 to generate encrypted private application key $K_{A(PRIV)}$ 430. In one example $K_{D(PUB)}$ may be a public key that corresponds to a private device key held by a particular client system. In this way, key encrypter 400 may bind $K_{A(PRIV)}$ 410 to a particular client system. For instance, in some embodiments, only the client system that holds the correct private device key will be able to decrypt encrypted private application key $K_{A(PRIV)}$ 430 to determine $K_{A(PRIV)}$ 410, which may be utilized to decrypt an application packaged in the manner described above with respect to FIG. 1.

In one example, a client system may provide a merchant system (e.g., a system implementing an e-commerce portal) with a digital certificate (e.g., an X.509 certificate) that includes device key 420. The merchant system may utilize a key encrypter 400 (or similar logic) to encrypt private application key 410 with the aforesaid device key in order to generate encrypted private application key 430. In this way, only the client system that has access to the appropriate private device key (e.g., the device key that corresponds to public device key 420) will be able to decrypt encrypted private application key 430 to determine the unencrypted version of such key (e.g., private application key 410).

Figure 7:
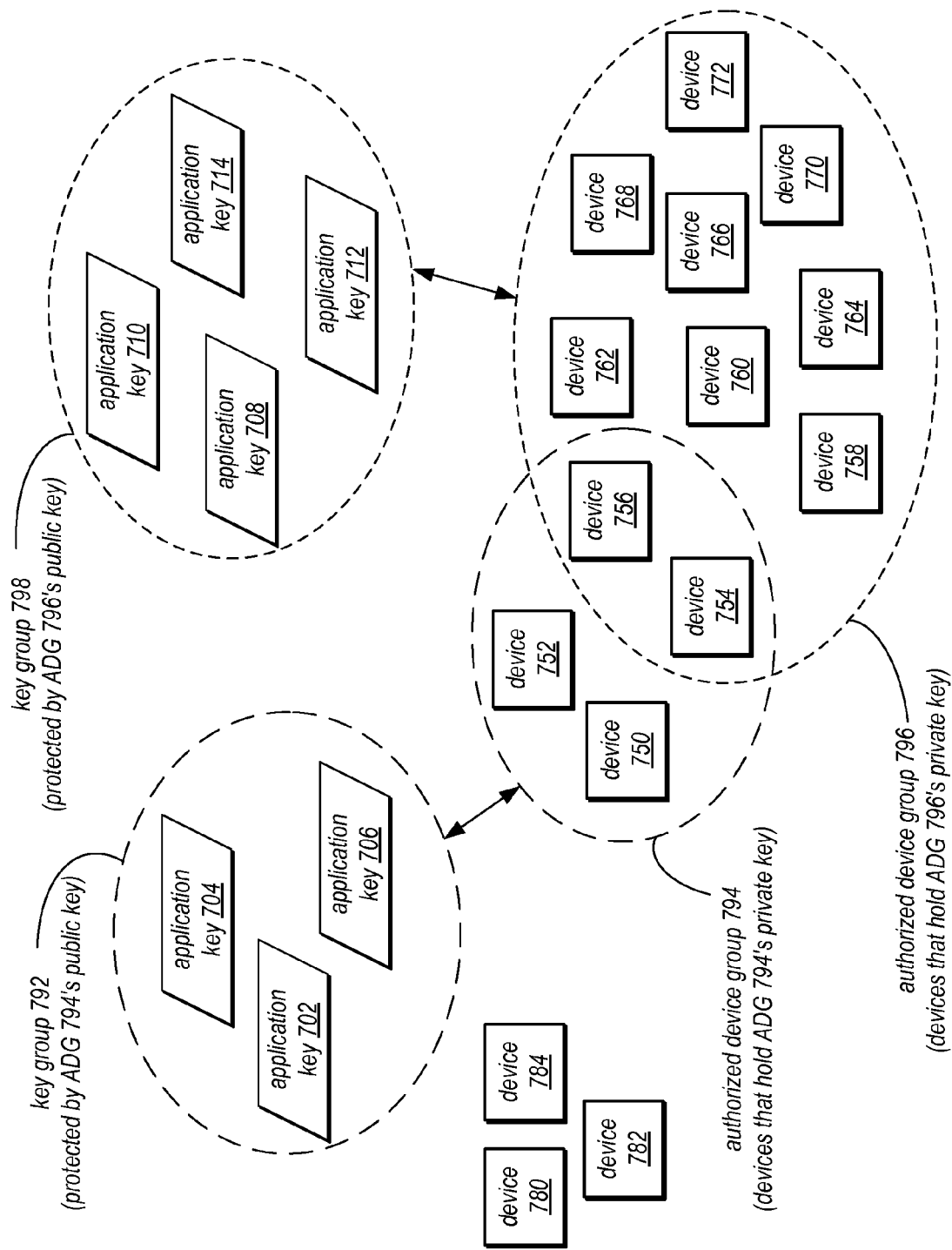
FIG. 7 illustrates a logical representation of multiple authorized device groups, according to various embodiments.

Note that in various embodiments, instead of encrypting private application key 410 with a device key, key encrypter 400 may be configured to encrypt private application key 410 with an authorized device group public key, as described in more detail with respect to FIG. 7.

Application Decryption and Content Consumption

FIG. 5 illustrates client device 500 configured to consume content that is bound to a secure application as described above. In various embodiments, client device 500 may include a runtime component 510 configured to retrieve and decrypt the various elements illustrated in FIG. 5. Some examples of a runtime component 510 include Adobe® Flash® Player and Adobe® AIR®. In various embodiments, runtime component 510 may be configured to receive encrypted private application key 430 and encrypted application 150. For example, such elements may be retrieved from an e-commerce portal for consuming content sold through such e-commerce portal. For instance, a website that rents or sells downloadable video content may also provide the application (e.g., a video player) through which that video content is to be consumed. In various embodiments, runtime component 510 may be configured to retrieve an encrypted content key $K_C$ 320, which may in some cases be received within a content license 530. Content license 530 may also include usage rules 535 in some embodiments. Additionally, runtime component 510 may be configured to retrieve an encrypted content item 230. For instance, encrypted content item 230 may be downloaded or streamed to client device 500.

In some embodiments, the usage rules of content license 530 may include executable instructions (e.g., executable bytecode) representing the content encryption key and/or the usage rules of the license. In such embodiments, the runtime component and/or the DRM component may be configured to execute such instructions at content consumption time in order to decrypt the content and implement such usage rules. In various embodiments, runtime component 510 may be configured to execute such instructions with a secure virtual machine via a secure load process (e.g., described in more detail below).

In various embodiments encrypted content item 230 may be bound to encrypted application 150 via a binding key (e.g., as described above with respect to FIG. 3). Runtime component 510 may be configured to decrypt encrypted application 150 and encrypted content item 230 according to various techniques described herein. Additionally, runtime component 510 may offload any or all of the cryptographic tasks (e.g., application, content, or key decryption) to a DRM component 540 configured to perform data encryption/decryption (e.g., symmetric or asymmetric encryption/decryption).

In various embodiments, runtime component 510 may decrypt encrypted private application key 430 with a private device key $K_{D(PRIV)}$ 520 assigned to the runtime component (or assigned to the client device). In one embodiment, client device 500 may receive private device key $K_{D(PRIV)}$ 520 from an individualization server in response to providing such a server with device information of client device 500 (e.g., component identifiers, such as processor or motherboard identifiers). In some cases, the private device key $K_{D(PRIV)}$ 520 may be unique to such device information. The result of decrypting the encrypted private application key $K_{A(PRIV)}$ 430 is illustrated as the unencrypted $K_{A(PRIV)}$ 410. In various embodiments, only a client device that has possession of the appropriate private device key may decrypt the private application key.

Runtime component 510 may be configured to decrypt encrypted application 150 with private application key $K_{A(PRIV)}$ 410. The result of this decryption is illustrated as application 110, which may be executed by client device 500 and/or the runtime component 510. One example of an application 110 may be a SWF file, which may be executed by Adobe® Flash® Player. As illustrated, decrypted application 110 may include usage rules 120 as well as private binding key $K_{B(PRIV)}$ 130. This binding key may be utilized by the runtime component 510 to decrypt an encrypted content key as described in more detail below.

As illustrated, runtime component 510 may also be configured to retrieve content, such as encrypted content item 230, and associated content keys for consuming such content, such as encrypted $K_C$ 320. For example, runtime component 510 might download video content (and associated content decryption keys) from an e-commerce portal that sells or rents such video content. In some embodiments, the encrypted content key $K_C$ 320 may be received as part of a content license 530, which may also include usage rules for consuming the content. This content license may be but need not be received from a license server in various embodiments. Also note that the usage rules 535 of content license 530 may be different than usage rules 120, which are included within application 110. Runtime component 510 may be configured to decrypt encrypted key $K_C$ 320 with $K_{B(PRIV)}$ 130 from application 110 to generate $K_C$ 220, which is the content key for decrypting encrypted content item 230. Runtime component 510 may also be configured to decrypt encrypted content item 230 with content key $K_C$ 220 to generate content 210 (in other cases, this task may be offloaded to DRM component 540). In various embodiments, runtime component 510 may execute application 110 to consume (e.g., play) content 210 with the application. In various embodiments, consuming content 210 via application 110 may cause the display of such content on one or more displays and/or audio speakers coupled to client device 500.

As illustrated above, content 210 may not be able to be decrypted and consumed without the private binding key 130 from the decrypted application 130, in various embodiments. In this way, the particular content 210 may be bound to application 110, which may be secure because it is transmitted in encrypted form. Also note that runtime component 510 may ensure that applications (e.g., application 110) and data (e.g., various encryption/decryption keys) are protected by a tamper-resistant computing environment in various embodiments. In various embodiments, tamper-resistance may ensure that attacks on such applications and data (e.g., a memory inspection intended to determine a decryption key) cannot be performed successfully. For instance, in various embodiments, runtime component 510 may execute application 110 within a tamper-resistant virtual machine. Such a tamper-resistant virtual machine may in various embodiments ensure that the private binding key of application 110 remains secret during execution. The tamper-resistant virtual machine implemented by the runtime component may utilize various tamper-resistance techniques including but not limited to anti-debugging techniques and encrypted memory areas within system memory. Such tamper-resistance techniques may in various embodiments prevent the tampering of application 110 when executed by runtime component 510. In various embodiments, while executing within the tamper-resistant (or "secure") virtual machine, application 110 may be configured to evaluate its usage rules and provide an indication of such evaluation to the runtime component. For instance, if the usage rules include a rule that specifies content can only be consumed on the first Tuesday of every month (for example), the application may be configured to determine whether the usage rule is met (i.e., determine that the current date is the first Tuesday of the current month) or that the usage rules is not met (e.g., determine that the current date is not the first Tuesday of the current month). In general, any operation performed by the runtime component described herein may be performed via a secure virtual machine or other tamper-resistant environment, in some embodiments. Also note that in some embodiments application 110 may not execute independently of the runtime component (and/or the secure virtual machine implemented by the runtime component). For instance, application 110 may in some embodiments define a set of instructions or operations and runtime component 510 may be configured to perform such instructions/operations.

In various embodiments, runtime component 510, DRM component 540, and/or application 110 may be configured to enforce usage rules 120, usage rules 535 or usage rules from encrypted content item 230 on content 210. (Note that application-specified usage rules 120 may be different and/or more sophisticated than usage rules 535 or usage rules of encrypted content item 230, in various embodiments.) For example, if usage rules 120 specify that content 210 is permitted to be consumed on odd days only or on the second Tuesday of every month, for example, the aforesaid component may ensure that the consumption of content 210 by application 110 adheres to such usage rules.

Example Methods

Figure 6:
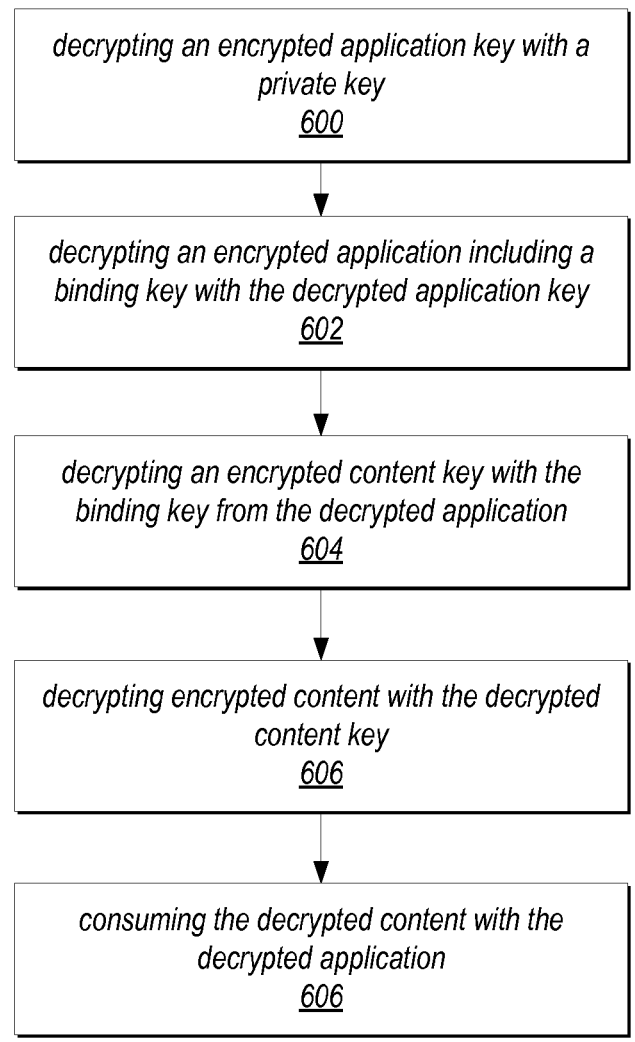
FIG. 6 illustrates a flowchart of an example method for a decryption process, according to various embodiments.

The system and method for digital rights management with secure application-content binding may include various methods, an example of which is illustrated by the flowchart of FIG. 6. In various embodiments, the method illustrated by the flowchart of FIG. 6 may be implemented by a client device 500 and/or runtime component 510 described above. As illustrated by block 600, the method may include decrypting an encrypted application key with a private key. One example of such decryption is described above with respect to decrypting encrypted application key $K_{A(PRIV)}$ 430 with a private key (e.g., private device key 520). In various embodiments, the result of such decryption may be a decrypted version of the application key (e.g., $K_{A(PRIV)}$ 410).

As illustrated by block 602, the method may also include decrypting an encrypted application including a binding key with the decrypted application key. One example of such a decryption is described above with respect to decrypting encrypted application 150 with $K_{A(PRIV)}$ 410. In various embodiments, the application decrypted may include embedded usage rules (e.g., usage rules 120) as well as a private binding key (e.g., private binding key 130). The method may also include decrypting an encrypted content key with the binding key from the decrypted application (block 604). One example of such decryption is described above with respect to runtime component 510 decrypting encrypted $K_C$ 320 with $K_{B(PRIV)}$ 130. The result of this decryption may be a decrypted version of the content key (e.g., $K_C$ 220). In various embodiments, performing the decryption of encrypted application key (block 600) and performing the decryption of the encrypted application (block 602) may be performed via a tamper-resistant virtual machine (described above) configured to perform a secure load process. In this way, the binding key within the application may be protected from being compromised in various embodiments.

In various embodiments, the method may also include decrypting encrypted content with the decrypted content key (block 606). One example of such decryption is described above with respect to runtime component 510 decrypting encrypted content item 230 with $K_C$ 220. The result of such decryption may be unencrypted content (e.g., content 210).

As illustrated by block 606, the method may also include consuming the decrypted content with the decrypted application. One example of such consumption is described above with respect to application 110 consuming content 210. For example, the decrypted application might be a video player, the decrypted content may be decrypted video, and the consumption of such content may include playing the decrypted video via the video player.

In various embodiments, the encrypted application may include one or more encrypted usage rules. In such embodiments, the method may also include decrypting such usage rules to determine unencrypted usage rules. One example of such decryption is described above with respect to decrypting encrypted usage rules 160 to determine unencrypted usage rules 120. In various embodiments, the method may include consuming the decrypted content in accordance with such decrypted usage rules. For example, the decrypted usage rules might specify that content is permitted to be consumed on odd days only or on the second Tuesday of every month, for example, and the method may include enforcing such usage rules on the consumption of the content. In some cases, additional usage rules may be specified (e.g., usage rules 535), and the method may also include consuming the content in accordance with the additional usage rules. In general, usage rules may specify one or more operations that are permitted to be performed on the decrypted content. In various embodiments, application-specified usage rules (e.g., usage rules 120) may be more complex or more sophisticated than usage rules specified elsewhere (e.g., as part of a content license). For instance, as described above, by leveraging the breadth and flexibility of the programming language utilized to generate the decrypted application, application-specified usage rules may in various embodiments be more sophisticated than those supported by DRM components.

In some embodiments, the illustrated method may be performed on a computer system that is assigned a device key specific to that system (e.g., private device key 520). In such embodiments, the method may include determining the private key (e.g., the private key used to decrypt the encrypted application key) by decrypting an encrypted version of the private key with the device key. For instance, a system that sends the private key may wish to prevent interception of the private key by encrypting with a client system's device key such that other client systems cannot decrypt the private key.

Utilizing Authorized Device Groups for Protecting Application Keys

In the various embodiments described above, the private application keys for decrypting secured applications are described as being device-specific keys, such as $K_{D(PRIV)}$ 520. In various embodiments, authorized device group ("ADG") keys may be utilized to encrypt/decrypt private application keys (e.g., $K_{A(PRIV)}$ 410) instead of the device-specific keys described above.

FIG. 7 illustrates a logical representation of multiple ADGs and the application keys accessible by devices within such ADGs. In the illustrated embodiment, two ADGs 794 and 796 are illustrated. Key group 792 may be accessible to ADG 794 and key group 798 may be accessible to ADG 796. Note that while only two key groups and two ADGs are illustrated in FIG. 7, there may be any quantity of key groups and any quantity of ADGs in various embodiments. Additionally, in various embodiments a given key group may include any number of application keys and a given ADG may include any number of devices (e.g., computer systems, such as client device 500).

In various embodiments, each ADG may be assigned a public key-private key pair. In some embodiments, this assignment may be performed by an ADG management server (e.g., the ADG management server of FIG. 8). The aforesaid key pair may be utilized in various embodiments to associate or "bind" a particular private application key with a particular ADG and/or grant a particular device membership in a particular ADG.

Binding Content to an ADG—The public key of an ADG's public key-private key pair may be utilized to bind a private application key to that ADG. Note that in various embodiments a private application key may include any private key that corresponds to a public key utilized to encrypt an application (see e.g., FIG. 1 described above). In various embodiments, the encryption key utilized to encrypt a private application key may limit that private application key to a particular ADG (i.e., only devices of that ADG may be able to access that private application key). By way of example, private application key 702 may be private application key 410 described above. This private application key may be encrypted with the public key of the private key-public key pair associated with ADG 794 (instead of $K_{D(PUB)}$ 420 as described with respect to FIG. 4). Accordingly, FIG. 7 illustrates private application key 702 as being accessible to any of devices 750-756. In various embodiments, the reason that private application key 702 is accessible to such devices is that devices 750-756 may hold the private key of the private key-public key pair assigned to ADG 794. Any of such devices (should they receive private application key 702) would in various embodiments be able to use that private key to decrypt private application key 702 and use the decrypted private application key (e.g., $K_{A(PRIV)}$ 410) to decrypt an encrypted application (e.g., decrypt encrypted application 150 to generate application 110). Note that private application key 704 and private application key 706 may be bound to ADG 794 in manner similar to that of private application key 702. Additionally, private application keys 708-714 may be bound to ADG 796 in manner similar to that of the binding between key group 792 and ADG 794. Note that over time the constituent private application keys of a given key group may change (e.g., additional private application keys may be bound to an ADG).

Figure 8:
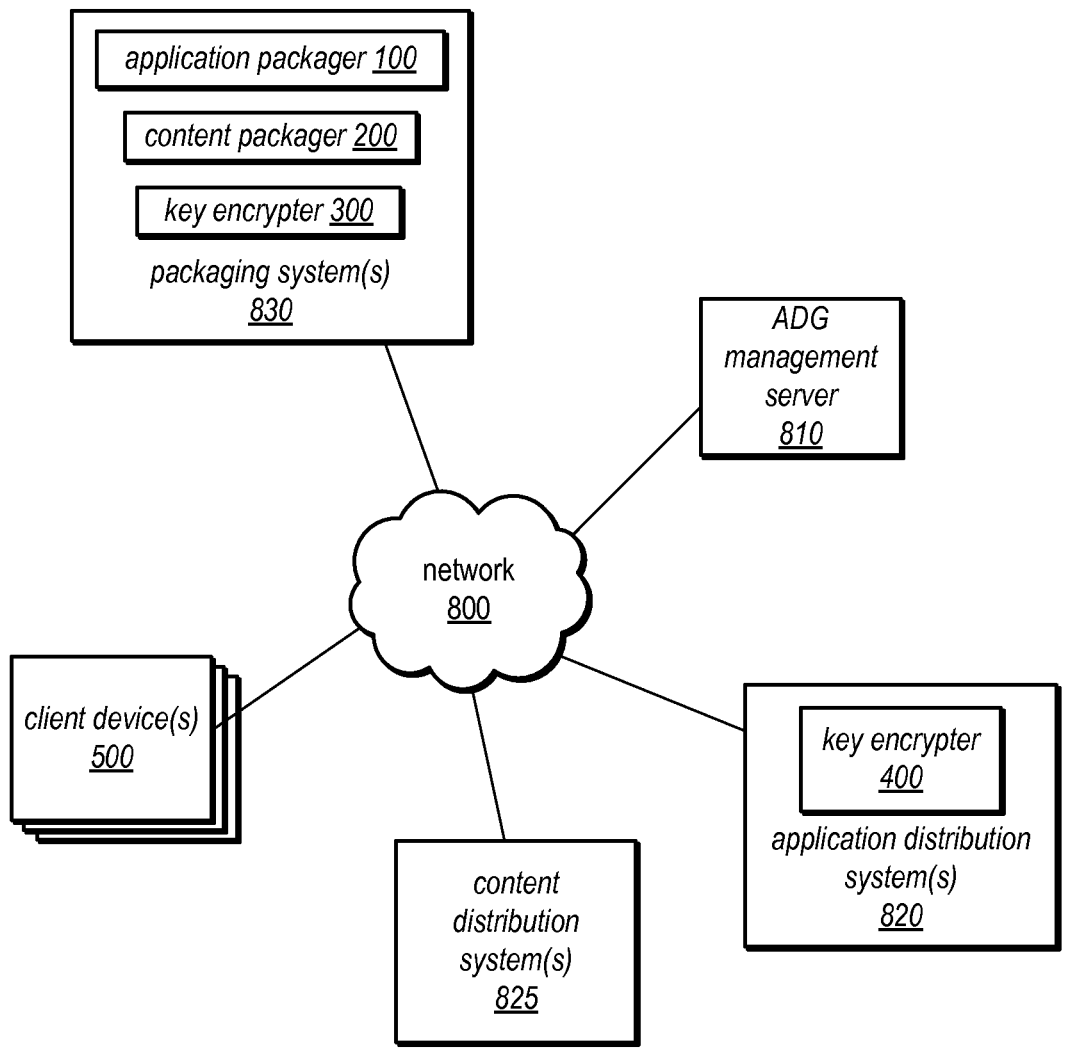
FIG. 8 illustrates an example system configuration suitable for implementing various components of the system and method for digital rights management with secure application-content binding, according to various embodiments.

Managing Device Membership in an ADG—The private key of an ADG's public key-private key pair may be utilized to grant a device entry into an ADG. To grant a given device entry into a particular ADG, an ADG management server (as illustrated in FIG. 8) or another system may provide the given device the private key of the public key-private key pair assigned to that particular ADG. In some embodiments, the possession of this private key by a device may indicate that the device is a member of the corresponding ADG. Note that in some embodiments, various conditions must be met before the provisioning of an ADG's private key to a particular device. In one example, the device may need to perform an authentication process, such as providing proof of identity or performing some other authentication-related task. For instance, the device may need to provide credentials, such as a digital certificate signed by a trusted third party and/or a particular username and password combination. In some embodiments, a device may gain membership into an authorized device group by providing one or more credentials to an ADG management server (e.g., ADG management server 810) in order to become a member of a given ADG.

By way of example, device 758 may have gained membership within ADG 796 by obtaining the private key of the public key-private key pair corresponding to ADG 796. By virtue of possessing that private key, device 758 may be configured to decrypt a private application key of key group 798 and use that decrypted private application key to decrypt an encrypted application (e.g., decrypt an encrypted video player or SWF file), such as encrypted application 150. Any of devices 754-772 may have gained membership within ADG 796 in a similar manner. Similarly, devices 750-756 may have gained membership within ADG 794 by obtaining the private key of the public key-private key pair assigned to ADG 794.

In various embodiments, a given device may be a member of multiple ADGs and thus may access private application keys of multiple key groups. For example, in the illustrated embodiment, device 754 and device 756 are each members of ADG 794 and ADG 796 (which means that they may be configured to decrypt private application keys of key group 792 and key group 798). For instance, device 754 and device 756 may each have obtained the private key assigned to ADG 794 as well as the private key assigned to ADG 796. Additionally, in some embodiments, some devices may not be members of any ADG and thus may not be able to decrypt private application keys bound to ADGs. For instance, device 780-784 in the illustrated embodiment may not be able to decrypt private application keys of key group 792 nor key group 798.

As described above, each ADG may correspond to a particular public key-private key pair for that ADG. In various embodiments, private application keys (e.g., private application key 430) may be protected (e.g., encrypted) with a public key of a particular ADG. In this way, any device that is a member of that ADG (e.g., any device that holds the corresponding private key) may be configured to decrypt such private application key (with the private key of that ADG) and utilize the decrypted private application key to decrypt an encrypted application (e.g., encrypted application 150). In various embodiments, this encryption scheme may be utilized as an alternative to utilizing $K_{D(PRIV)}$ 520 of FIG. 5.

Example System Configuration

Various embodiments of the system and method for digital rights management with secure application-content binding may be configured according to different system configurations. One example of such a system configuration is illustrated by the system of FIG. 8. In the illustrated embodiment, each of the elements of the framework described above is implemented as elements of respective computer systems. Each of the illustrated computer systems may in various embodiments communicate via a network, such as network 800. Network 800 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, each illustrated element may be a computer system configured to implement the respective components described above via hardware and/or software. Note that any of the elements illustrated in FIG. 8 may be implemented via one or more computer systems, such as the example computer system described below with respect to FIG. 9.

Also note that in the example embodiment illustrated, application packager 100, content packager 200, and key encrypter 300 may be implemented as components of one or more packaging systems 830. In various embodiments, any of the content described above may be distributed via content distribution systems 825, which may in some embodiments implement a content distribution network optimized for high-speed transmission of digital content. In some embodiments, the content distribution system(s) 825 may also distribute applications (e.g., encrypted application 150). In other cases, such application may be implemented by other systems, such as application distribution system(s) 820, which may include key encrypter 400 (e.g., for encrypting application keys with device keys or ADG keys, as described above). In some embodiments, content distribution system(s) and/or application distribution system(s) 820 may be controlled by a merchant (e.g., a merchant managing an e-commerce portal that offers digital content as the basis of commercial transactions).

Example Computer System

Various embodiments of a system and method for digital rights management with secure application-content binding, as described herein, may be executed on one or more computer systems, which may interact with various other devices. One such computer system is computer system 900 illustrated by FIG. 9, which may in various embodiments implement any of the elements illustrated in FIGS. 1-8. Computer system 900 may be configured to implement a runtime component 510, application 110, and/or DRM component 540, each of which may be stored in memory as processor-executable executable program instructions 922 (e.g., program instructions executable by processor(s) 910). In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, data 932 may include a private device key $K_{D(PRIV)}$ 520 (or, alternatively, an ADG private key), a private application key $K_{A(PRIV)}$ 410, a decrypted content key 220, and decrypted content 210. In various embodiments, program instructions 922 may be executable by the processor(s) to implement runtime component 510, application 110, and/or DRM component 540. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the framework described above may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 800), such as other computer systems (e.g., elements 810-830 described above with respect to FIG. 8), or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

In some embodiments, the illustrated computer system may implement any of the methods described above, such as the method illustrated by FIG. 6. In other embodiments, different elements and data may be included.

Those skilled in the art will appreciate that computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the embodiments described herein may be practiced with other computer system configurations.

Various embodiments may further include receiving, sending or storing instructions and/or data implemented in accordance with the foregoing description upon a computer-accessible medium. Generally speaking, a computer-accessible medium may include a storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method, comprising:
    performing, by one or more computers:
        decrypting an encrypted application key with a private key;
        decrypting an encrypted application including a binding key with the decrypted application key, the binding key being distinct from the decrypted application key and the encrypted application key, the encrypted application comprising one or more usage rules being stored within data representing the encrypted application, the decrypting the encrypted application including decrypting the one or more usage rules;
        decrypting an encrypted content key with the binding key from the decrypted application;
        decrypting encrypted content with the decrypted content key; and
        consuming the decrypted content with the decrypted application.

2. The method of claim 1, wherein consuming the decrypted content with the decrypted application comprises consuming the decrypted content in accordance with the one or more decrypted usage rules from the decrypted application.

3. The method of claim 1, further comprising receiving a content license comprising the encrypted content key and one or more additional usage rules, wherein the method comprises consuming the decrypted content in accordance with the one or more usage rules from the decrypted application and the one or more additional usage rules from the content license.

4. The method of claim 1, wherein the one or more usage rules specify one or more operations that are permitted to be performed on the decrypted content.

5. The method of claim 1, further comprising, prior to decrypting the encrypted application key with the private key, determining the private key by decrypting an encrypted version of the private key with an authorized device group private key.

6. The method of claim 5, further comprising receiving said authorized device group private key subsequent to performing an authentication process comprising providing one or more credentials to an authorized device group management server.

7. The method of claim 1, wherein said computer-implemented method is implemented on a particular computer system assigned a device key specific to the particular computer system; wherein the method comprises, prior to decrypting the encrypted application key with the private key, determining the private key by decrypting an encrypted version of the private key with said device key.

8. The method of claim 1, wherein said content comprises one or more of: audio content, video content, image content and text content.

9. The method of claim 1, wherein said decrypting the encrypted content key with the binding key and said decrypting the encrypted content with the decrypted content key are performed in response to receiving said encrypted content from a remote network location.

10. The method of claim 1, further comprising performing said decrypting the encrypted application key and said decrypting the encrypted application via a tamper-resistant virtual machine configured to perform a secure load process.

11. A system, comprising:
    a memory; and
    one or more processors coupled to the memory, the memory comprising program instructions to implement a runtime component configured to:
        decrypt an encrypted application key with a private key;
        decrypt an encrypted application including a binding key with the decrypted application key, the binding key being distinct from the decrypted application key and the encrypted application key, the encrypted application comprising one or more usage rules generated with a programming language used to generate the encrypted application, the decrypt the encrypted application including decrypting the one or more usage rules;

decrypt an encrypted content key with the binding key from the decrypted application;

decrypt encrypted content with the decrypted content key; and consume the decrypted content with the decrypted application.

12. The system of claim 11, wherein to consume the decrypted content with the decrypted application the runtime component is configured to consume the decrypted content in accordance with the one or more decrypted usage rules from the decrypted application.

13. The system of claim 11, wherein the runtime component is configured to receive a content license comprising the encrypted content key and one or more additional usage rules, wherein to consume the decrypted content the runtime component is configured to consume the decrypted content in accordance with the one or more usage rules from the decrypted application and the one or more additional usage rules from the content license.

14. The system of claim 11, wherein said content comprises one or more of: audio content, video content, image content and text content.

15. The system of claim 11, wherein the runtime component is configured to decrypt the encrypted content key with the binding key and decrypt the encrypted content with the decrypted content key in response to receiving said encrypted content from a remote network location.

16. The system of claim 11, wherein the runtime component is configured to perform the decryption of the encrypted application key and the decryption of the encrypted application via a tamper-resistant virtual machine configured to perform a secure load process.

17. A non-transitory computer-readable storage medium, storing program instructions computer-executable on a computer system to implement a runtime component configured to:

decrypt an encrypted application key with a private key;

decrypt an encrypted application including a binding key with the decrypted application key, the binding key being distinct from the decrypted application key and the encrypted application key, the encrypted application comprising one or more usage rules being a substitute for at least one usage rule of a content license, the decrypt the encrypted application including decrypting the one or more usage rules;

decrypt an encrypted content key with the binding key from the decrypted application;

decrypt encrypted content with the decrypted content key; and consume the decrypted content with the decrypted application.

18. The medium of claim 17, wherein to consume the decrypted content with the decrypted application the runtime component is configured to consume the decrypted content in accordance with the one or more decrypted usage rules from the decrypted application.

19. The medium of claim 17, wherein the runtime component is configured to receive a content license comprising the encrypted content key and one or more additional usage rules, wherein to consume the decrypted content the runtime component is configured to consume the decrypted content in accordance with the one or more usage rules from the decrypted application and the one or more additional usage rules from the content license.

20. The medium of claim 17, wherein said content comprises one or more of: audio content, video content, image content and text content.

21. The medium of claim 17, wherein the runtime component is configured to decrypt the encrypted content key with the binding key and decrypt the encrypted content with the decrypted content key in response to receiving said encrypted content from a remote network location.

22. The medium of claim 17, wherein the runtime component is configured to perform the decryption of the encrypted application key and the decryption of the encrypted application via a tamper-resistant virtual machine configured to perform a secure load process.

* * * * *